United States Patent  (10) Patent No.: US 9,521,641 B2
Fujishiro et al.  (45) Date of Patent: Dec. 13, 2016

(54) USER TERMINAL AND BASE STATION FOR A DEVICE TO DEVICE PROXIMITY SERVICE

(71) Applicant: KYOCERA CORPORATION, Kyoto-shi, Kyoto (JP)

(72) Inventors: Masato Fujishiro, Yokohama (JP); Henry Chang, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 15/048,056

(22) Filed: Feb. 19, 2016

(65) Prior Publication Data

US 2016/0174181 A1 Jun. 16, 2016

Related U.S. Application Data

(63) Continuation of application No. PCT/JP2015/063261, filed on May 8, 2015.

(60) Provisional application No. 61/990,936, filed on May 9, 2014.

(51) Int. Cl.
H04W 72/00 (2009.01)
H04W 60/00 (2009.01)
H04W 48/12 (2009.01)
H04W 92/18 (2009.01)
H04W 4/00 (2009.01)
H04W 8/00 (2009.01)
H04W 88/02 (2009.01)
H04W 88/08 (2009.01)

(52) U.S. Cl.
CPC ............ *H04W 60/00* (2013.01); *H04W 4/008* (2013.01); *H04W 8/005* (2013.01); *H04W 48/12* (2013.01); *H04W 92/18* (2013.01); H04W 88/02 (2013.01); H04W 88/08 (2013.01)

(58) Field of Classification Search
CPC .... H04W 76/023; H04W 8/005; H04W 4/008; H04W 76/043; H04W 92/18; H04W 4/08
USPC ................ 370/389, 400, 406, 328–337, 339, 370/341–348, 431–463; 455/422.1, 455/450–455, 455/464, 509
See application file for complete search history.

(56) References Cited

U.S. PATENT DOCUMENTS

2011/0228666 A1* 9/2011 Barbieri ............. H04W 76/023
  370/216
2014/0328329 A1* 11/2014 Novlan ............... H04W 72/042
  370/336
2015/0172037 A1 6/2015 Morita

FOREIGN PATENT DOCUMENTS

WO 2014/034572 A1 3/2014
WO 2015/053382 A1 4/2015

OTHER PUBLICATIONS

3rd Generation Partnership Project; Technical Specification Group Radio Access Network; Study on LTE Device to Device Proximity Services; Radio Aspects (Release 12); 3GPP TR 36.843 v12.0.1; Mar. 2014; pp. 1-50; 3GPP Organizational Partners.
Kyocera; Consideration of Inter-cell D2D Service:; 3GPP TSG-RAN WG2 #85bis; R2-141386; Mar. 31-Apr. 4, 2014, pp. 1-5; Valencia, Spain.

(Continued)

*Primary Examiner* — Ronald Eisner

(57) ABSTRACT

A user terminal exists in a first cell operating at a first frequency, in a mobile communication system that supports a D2D (Device to Device) proximity service. The user terminal includes a transmitter configured to transmit a D2D interest indication indicating that the user terminal has an interest in the D2D proximity service, to a base station forming the first cell.

12 Claims, 11 Drawing Sheets

(56) References Cited

OTHER PUBLICATIONS

Qualcomm Incorporated;"Techniques for D2D Discovery"; 3GPP TSG-RAN WG1 #73; R1-132503; May 20-24, 2013;pp. 1-7; Fukuoka, Japan.
Intel Corporation; "Type 1 Resouce Allocation for D2D Discovery";3GPP TSG-RAN2 Meeting #84; R2-134285; Nov. 11-15, 2013: pp. 1-5; San Francisco, USA.
Kyocera; "Inter-Frequency Discovery Considerations"; 3GPP TSG-RAN WG2 #86; R2-142240; May 19-23, 2014; pp. 1-10; Seoul, Republic of Korea.
International Search Report (Form PCT/ISA/210) mailed on Aug. 4, 2015, issued for International Application No. PCT/JP2015/063261.

\* cited by examiner

USER TERMINAL AND BASE STATION FOR A DEVICE TO DEVICE PROXIMITY SERVICE

RELATED APPLICATIONS

This application is a continuation application of international application PCT/JP2015/063261, filed May 8, 2015, which claims benefit of U.S. provisional application 61/990,936, filed May 9, 2014, the entirety of both applications hereby expressly incorporated by reference.

TECHNICAL FIELD

The present disclosure relates to a user terminal and a base station that are used in a mobile communication system.

BACKGROUND ART

In 3GPP (3rd Generation Partnership Project) which is a project aiming to standardize a mobile communication system, the introduction of a Device-to-Device (D2D) proximity service is discussed as a new function on and after Release 12 (see Non Patent Document 1).

The D2D proximity service (D2D ProSe) is a service in which direct device-to-device communication is provided within a synchronization cluster formed by a plurality of user terminals which are synchronized to one another. The D2D proximity service includes a discovery procedure (Discovery) in which a proximal terminal is discovered and D2D communication (Communication) that is direct Device-to-Device communication.

A discovery procedure, in which a user terminal that exists in a first cell discovers a proximal terminal that exists in a second cell which is provided around the first cell, is called an inter-cell discovery procedure (Inter-cell discovery). D2D communication in which a user terminal that exists in the first cell performs communication with a proximal terminal that exists in the second cell is called inter-cell D2D communication (Inter-cell communication).

However, in a case where a frequency employed in the first cell and a frequency employed in the second cell differ, even when the user terminal transmits a discovery signal in order to discover the proximal terminal in the Inter-cell discovery, the proximal terminal is not capable of receiving the discovery signal. Therefore, in such a case, a procedure in which the Inter-cell discovery is appropriately performed is desired.

PRIOR ART DOCUMENTS

Non Patent Document

[Non Patent Document 1] 3GPP technical report "TR 36.843 V12.0.1" March, 2014

SUMMARY

A first aspect is summarized as a user terminal that exists in a first cell operating at a first frequency in a mobile communication system that supports a D2D proximity service, the user terminal including: a transmitter configured to transmit a discovery signal for discovering a proximal terminal that exists in a second cell different from the first cell by using radio resources of a second frequency different from the first frequency, wherein the radio resources of the second frequency are radio resources used exclusively for an uplink.

A second aspect is summarized as a base station forming at least a first cell operating at a first frequency, including: a controller configured to assign, to a user terminal that exists in the first cell, radio resources of a second frequency different from the first frequency, wherein the radio resources of the second frequency are radio resources used exclusively for an uplink.

A third aspect is summarized as a user terminal that exists in a first cell operating at a first frequency in a mobile communication system that supports a D2D proximity service, the user terminal including: a transmitter configured to transmit a D2D interest indication for indicating an interest in the D2D proximity service, to a base station forming the first cell.

A fourth aspect is summarized as a user terminal that exists in a first cell operating at a first frequency, in a mobile communication system that supports a D2D proximity service, the user terminal including: a first receiver configured to perform reception at the first frequency which is a serving frequency; a second receiver configured to perform reception at a second frequency different from the first frequency; and a controller configured to monitor a discovery signal by using the second receiver, the discovery signal transmitted by another user terminal at the second frequency.

A fifth aspect is summarized as a user terminal that exists in a first cell operating at a first frequency, in a mobile communication system that supports a D2D proximity service, the user terminal including: a first transmitter configured to perform transmission at the first frequency which is a serving frequency; a second transmitter configured to perform transmission at a second frequency different from the first frequency; and a controller configured to perform a process of transmitting a discovery signal at the second frequency by using the second transmitter, to other user terminal.

DESCRIPTION OF EMBODIMENTS

Overview of Embodiments

A user terminal according to an embodiment exists in a first cell operating at a first frequency, in a mobile communication system that supports a D2D proximity service. The user terminal includes a transmitter configured to transmit a discovery signal for discovering a proximal terminal that exists in a second cell different from the first cell by using radio resources of a second frequency different from the first frequency. The radio resources of the second frequency are radio resources used exclusively for an uplink.

In the embodiment, a new concept of "radio resources of the second frequency used exclusively for an uplink" are introduced, and the user terminal transmits the discovery signal by using the radio resources of the second frequency. As a result, even in a case where the frequency employed in the first cell and the frequency employed in the second cell differ, the proximal terminal is capable of receiving the discovery signal to enable appropriate execution of the Inter-cell discovery.

A user terminal according to the embodiment exists in a first cell operating at a first frequency, in a mobile communication system that supports a D2D proximity service. The user terminal includes a transmitter configured to transmit a D2D interest indication indicating that the user terminal has an interest in the D2D proximity service, to a base station forming the first cell.

In the embodiment, a new concept of "D2D interest indication indicating that the user terminal has an interest in the D2D proximity service" is introduced, and the user terminal transmits the D2D interest indication to the base station forming the first cell. In other words, the base station is provided with decision-making information for performing a transition (handover or cell reselection) of the user terminal toward the frequency at which the D2D proximity service is provided. Therefore, even when the frequencies of the cells in which a plurality of user terminals exist differ from one another, it is possible to match the frequencies of the cells in which the plurality of user terminals exist to a frequency at which the D2D proximity service is provided, and it is possible to appropriately perform Inter-cell discovery.

First Embodiment

A first embodiment will be described by using, as an example, an LTE system based on 3GPP standards as a mobile communication system, below.

(1) System Configuration

Figure 1:
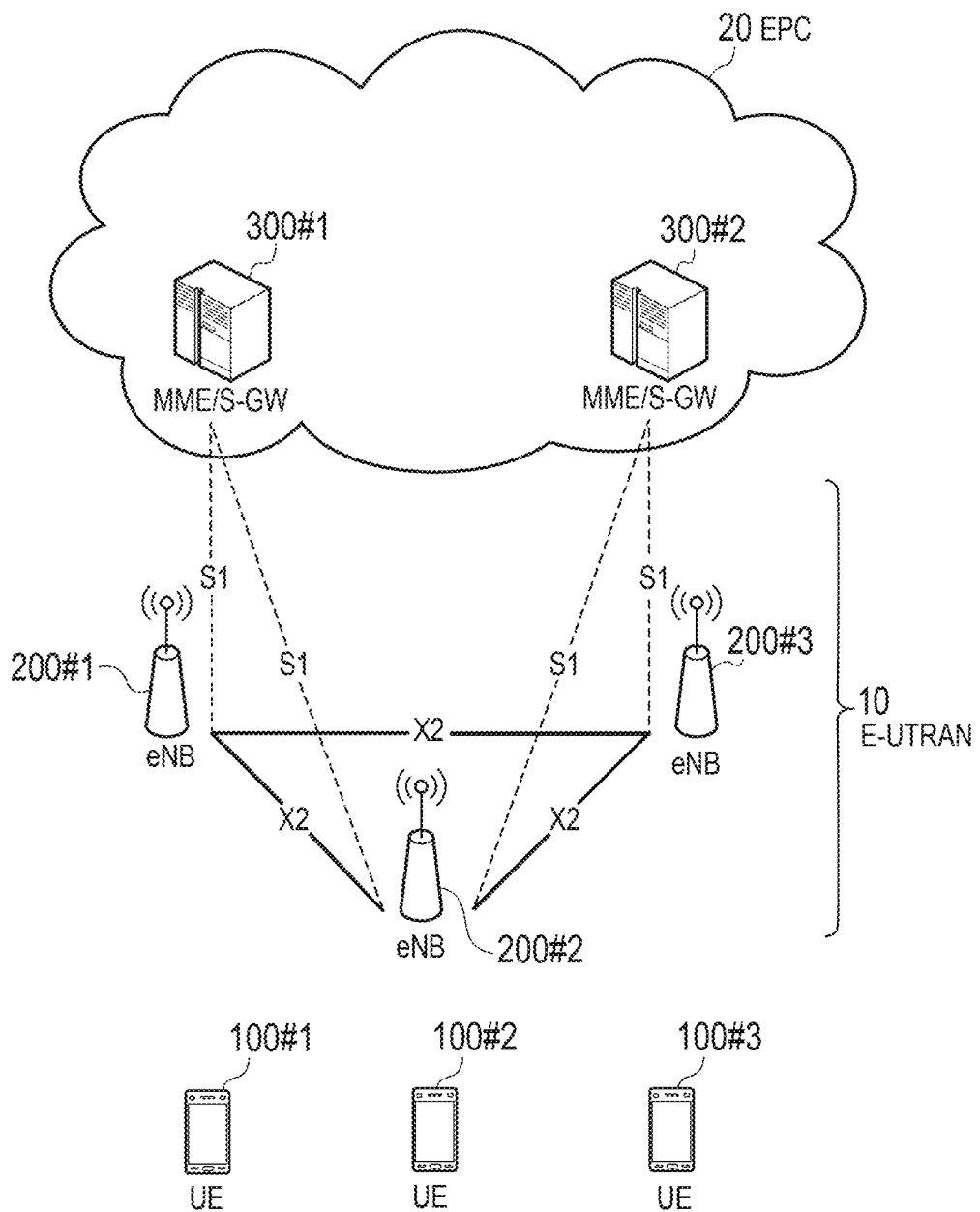
FIG. 1 is a configuration diagram of an LTE system according to a first embodiment.

First of all, the system configuration of LTE system according to a first embodiment will be described. FIG. 1 is a configuration diagram of the LTE system according to the first embodiment.

As illustrated in FIG. 1, the LTE system according to the first embodiment includes UE (User Equipment) 100, E-UTRAN (Evolved-UMTS Terrestrial Radio Access Network) 10, and EPC (Evolved Packet Core) 20.

The UE 100 corresponds to a user terminal. The UE 100 is a mobile communication device, which performs radio communication with a cell (a serving cell in a case where the UE 100 is in a connected state) formed by the eNB 200. The configuration of the UE 100 will be described later.

The E-UTRAN 10 corresponds to a radio access network. The E-UTRAN 10 includes eNB 200 (an evolved Node-B). The eNB 200 corresponds to a base station. The eNBs 200 are connected mutually via an X2 interface. The configuration of the eNB 200 will be described later.

The eNB 200 manages one or a plurality of cells, and performs radio communication with the UE 100 that establishes a connection with a cell of the eNB 200. The eNB 200 has a radio resources management (RRM) function, a routing function of user data, a measurement control function for mobility control and scheduling and the like. The "cell" is used as a term indicating a smallest unit of a radio communication area, and is also used as a term indicating a function of performing radio communication with the UE 100.

The EPC 20 corresponds to a core network. The EPC 20 includes MME (Mobility Management Entity)/S-GW (Serving-Gateway) 300. The MME performs different types of mobility control and the like for the UE 100. The S-GW performs transfer control of the user data. The MME/S-GW 300 is connected to the eNB 200 via an S1 interface. It is noted that the E-UTRAN 10 and the EPC 20 constitute a network of the LTE system.

Figure 2:
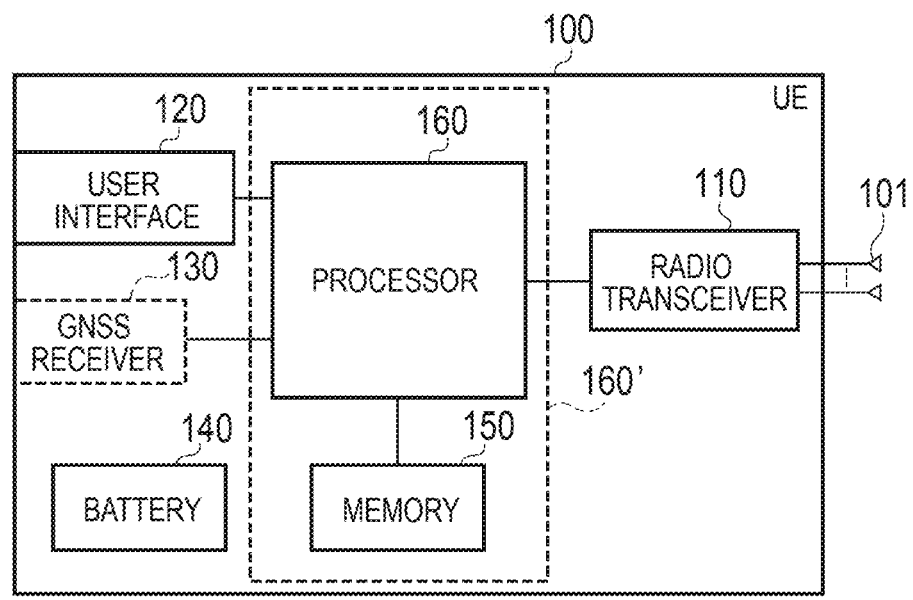
FIG. 2 is a block diagram of a UE 100 according to the first embodiment.

FIG. 2 is a block diagram of the UE 100. As illustrated in FIG. 2, the UE 100 includes a plurality of antennas 101, a radio transceiver 110, a user interface 120, a GNSS (Global Navigation Satellite System) receiver 130, a battery 140, a memory 150, and a processor 160. The memory 150 and the processor 160 constitute a controller. The radio transceiver 110 and the processor 160 constitute a transmitter and a receiver. The UE 100 may not necessarily have the GNSS receiver 130. Furthermore, the memory 150 may be integrally formed with the processor 160, and this set (that is, a chip set) may be called a processor 160'.

The antenna 101 and the radio transceiver 110 are used to transmit and receive a radio signal. The radio transceiver 110 converts a baseband signal (a transmission signal) output from the processor 160 into a radio signal, and transmits the radio signal from the antenna 101. Furthermore, the radio transceiver 110 converts a radio signal received by the antenna 101 into a baseband signal (a reception signal), and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for processing by the processor 160. The processor 160 includes a baseband processor that performs modulation and demodulation, encoding and decoding and the like on the baseband signal, and a CPU (Central Processing Unit) that performs various types of processes by executing the program stored in the memory 150. The processor 160 may further include a codec that performs encoding and decoding on sound and video signals. The processor 160 executes various types of processes and various types of communication protocols described later.

Figure 3:
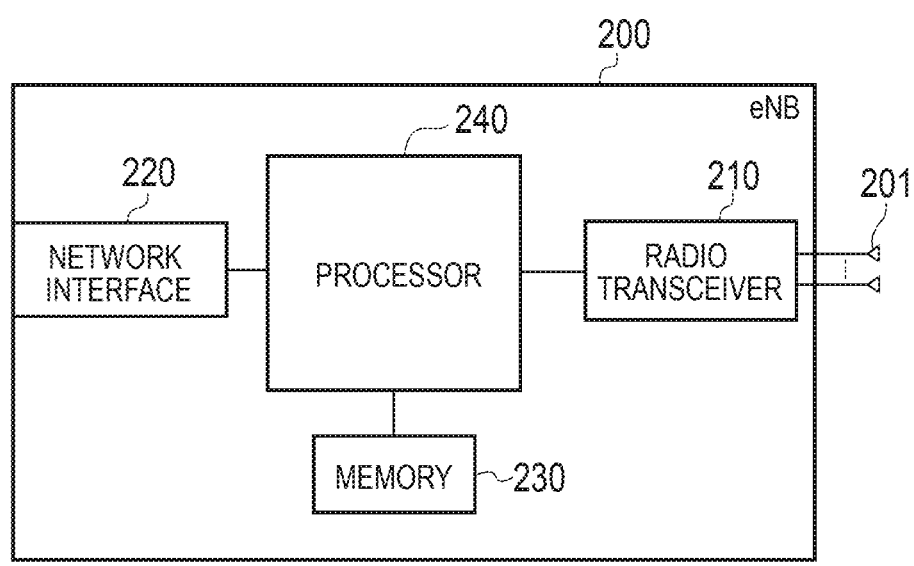
FIG. 3 is a block diagram of an eNB 200 according to the first embodiment.

FIG. 3 is a block diagram of the eNB 200. As illustrated in FIG. 3, the eNB 200 includes a plurality of antennas 201, a radio transceiver 210, a network interface 220, a memory 230, and a processor 240. The memory 230 and the processor 240 constitute a controller. The radio transceiver 210 and the processor 240 constitute a transmitter and a receiver. Furthermore, the memory 230 may be integrally formed with the processor 240, and this set (that is, a chipset) may be called a processor.

The antenna 201 and the radio transceiver 210 are used to transmit and receive a radio signal. The radio transceiver 210 converts a baseband signal (a transmission signal) output from the processor 240 into a radio signal, and transmits the radio signal from the antenna 201. Furthermore, the radio transceiver 210 converts a radio signal received by the antenna 201 into a baseband signal (a reception signal), and outputs the baseband signal to the processor 240.

The network interface 220 is connected to the neighboring eNB 200 via the X2 interface, and is connected to the MME/S-GW 300 via the S1 interface. The network interface 220 is used in communication performed on the X2 interface and communication performed on the S1 interface.

The memory 230 stores a program to be executed by the processor 240 and information to be used for processing by the processor 240. The processor 240 includes a baseband processor that performs modulation and demodulation, encoding and decoding and the like on the baseband signal and a CPU that performs various types of processes by executing the program stored in the memory 230. The processor 240 executes various types of processes and various types of communication protocols described later.

Figure 4:
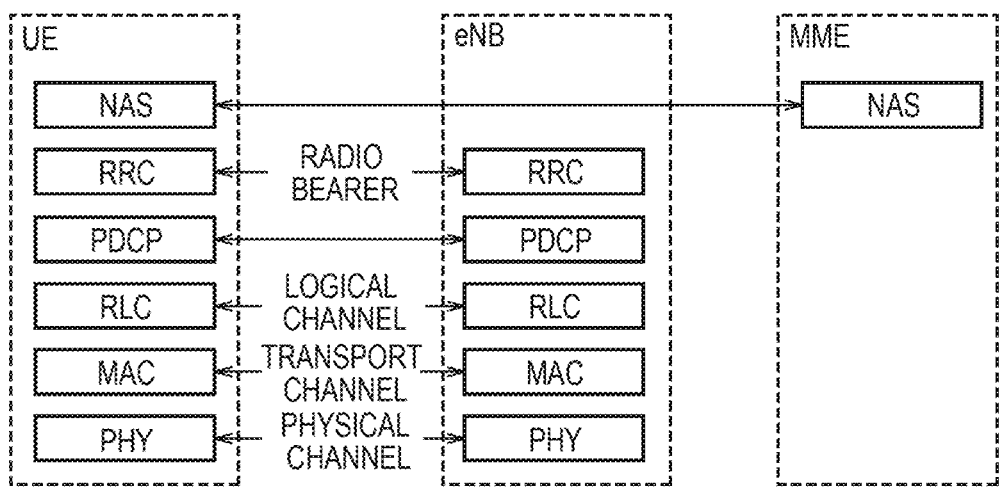
FIG. 4 is a protocol stack diagram of a radio interface according to the first embodiment.

FIG. 4 is a protocol stack diagram of a radio interface in the LTE system. As illustrated in FIG. 4, the radio interface protocol is classified into a first layer to a third layer of an OSI reference model, such that the first layer is a physical (PHY) layer. The second layer includes a MAC (Media Access Control) layer, an RLC (Radio Link Control) layer, and a PDCP (Packet Data Convergence Protocol) layer. The third layer includes an RRC (Radio Resource Control) layer.

The physical layer performs encoding and decoding, modulation and demodulation, antenna mapping and demapping, and resource mapping and demapping. Between the physical layer of the UE 100 and the physical layer of the eNB 200, user data and control signals are transmitted via a physical channel.

The MAC layer performs priority control of data, a retransmission process by a hybrid ARQ (HARQ), a random access procedure, and the like. Between the MAC layer of the UE 100 and the MAC layer of the eNB 200, user data and control signals are transmitted via a transport channel. The MAC layer of the eNB 200 includes a scheduler for determining a transport format (a transport block size and a modulation and coding scheme) of an uplink and a downlink, and resource blocks to be assigned to the UE 100.

The RLC layer transmits data to an RLC layer of a reception side by using the functions of the MAC layer and the physical layer. Between the RLC layer of the UE 100 and the RLC layer of the eNB 200, user data and control signals are transmitted via a logical channel.

The PDCP layer performs header compression and decompression, and encryption and decryption.

The RRC layer is defined only in a control plane that handles control signals. Between the RRC layer of the UE 100 and the RRC layer of the eNB 200, a control signal (an RRC message) for various types of settings is transmitted. The RRC layer controls a logical channel, a transport channel, and a physical channel according to the establishment, re-establishment, and release of a radio bearer. When there is a connection (an RRC connection) between the RRC of the UE 100 and the RRC of the eNB 200, the UE 100 is in an RRC connected state. Otherwise, the UE 100 is in an RRC idle state.

An NAS (Non-Access Stratum) layer positioned above the RRC layer performs session management, mobility management and the like.

Figure 5:
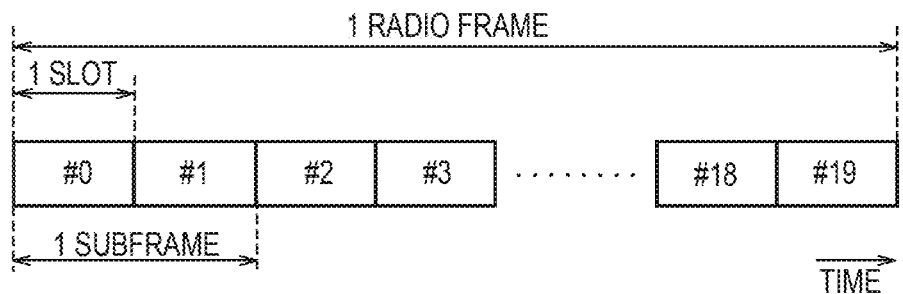
FIG. 5 is a configuration diagram of a radio frame used in the LTE system according to the first embodiment.

FIG. 5 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 5, a radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction (not shown), and a plurality of symbols in the time direction. Each resource block includes a plurality of subcarriers in the frequency direction. One symbol and one subcarrier forms one resource element. Of the radio resources (time and frequency resources) assigned to the UE 100, a frequency resource can be identified by a resource block and a time resource can be identified by a subframe (or a slot).

(2) D2D Proximity Service

A D2D proximity service will be described, below. An LTE system according to the first embodiment supports the D2D proximity service.

The D2D proximity service (D2D ProSe) is a service enabling direct UE-to-UE communication within a synchronization cluster formed by a plurality of UEs 100 which are synchronized to one another. The D2D proximity service includes a discovery procedure (Discovery) in which a proximal UE is discovered and D2D communication (Communication) that is direct UE-to-UE communication. The D2D communication is also called Direct communication.

A scenario in which all the UEs 100 forming the synchronization cluster are located inside the coverage of at least one cell is called "In coverage". A scenario in which all the UEs 100 forming the synchronization cluster are located outside a coverage of at least one cell is called "Out of coverage". A scenario in which some UEs 100, out of the plurality of UEs 100 forming the synchronization cluster, are located in a coverage of at least one cell and the remaining UEs 100 are located outside a coverage of at least one cell is called "Partial coverage".

In an "In coverage" scenario, the eNB 200 is a D2D synchronization source. A D2D non-synchronization source, from which a D2D synchronization signal is not transmitted, is synchronized with the D2D synchronization source. The eNB 200 that is a D2D synchronization source transmits a broadcast signal including D2D resource information indicating radio resources (resource pool) available for the D2D proximity service. The D2D resource information includes information indicating a resource pool for the discovery procedure (Discovery resource information) and information indicating a resource pool for the D2D communication (Communication resource information), for example. The UE 100 that is a D2D non-synchronization source performs the discovery procedure and the D2D communication on the basis of the D2D resource information received from the eNB 200.

In "Out of coverage" or "Partial coverage", the UE 100 is a D2D synchronization source. In "Out of coverage", the UE 100 that is a D2D synchronization source transmits D2D resource information indicating radio resources (resource pool) available for the D2D proximity service. The D2D resource information is included in the D2D synchronization signal, for example. The D2D synchronization signal is a signal transmitted in the synchronization procedure in which a device-to-device synchronization is established. The D2D synchronization signal includes a D2D SS and a physical D2D synchronization channel (PD2DSCH). The D2D SS is a signal for providing a synchronization standard of a time and a frequency. The PD2DSCH is a physical channel through which a greater amount of information can be carried than can be carried through the D2D SS. The PD2DSCH carries the above-described D2D resource information (the Discovery resource information and the Communication resource information). Alternatively, when the D2D SS is previously associated with the D2D resource information, the transmission of the PD2DSCH may be omitted.

The discovery procedure is used mainly when the D2D communication is performed by unicast. In a case where a first UE 100 starts D2D communication with a second UE 100, the first UE 100 uses any particular radio resource out of radio resources for the discovery procedure to transmit the discovery signal. On the other hand, in a case where the second UE 100 starts the D2D communication with the first UE 100, the second UE 100 scans the discovery signal within the resource pool for the discovery procedure to receive the discovery signal. The discovery signal may include information indicating radio resources used by the first UE 100 for the D2D communication.

Further, a discovery procedure in which a user terminal that exists in the first cell discovers the proximal terminal that exists in a second cell which is provided around the first cell is called an inter-cell discovery procedure (Inter-cell discovery). D2D communication in which a user terminal that exists in the first cell performs communication with the proximal terminal that exists in the second cell is called inter-cell D2D communication (Inter-cell communication).

(3) Operation Environment

Figure 6:
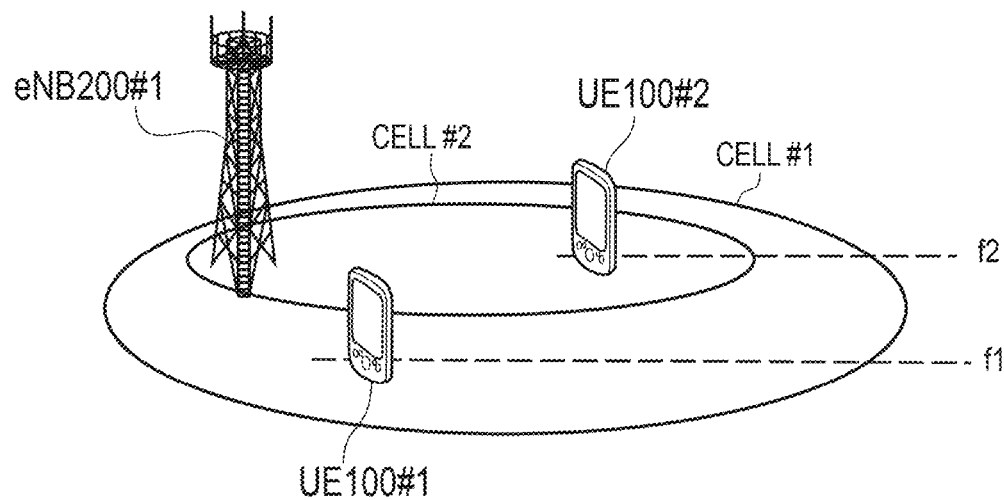
FIG. 6 is a diagram illustrating an operation environment according to the first embodiment.
Figure 7:
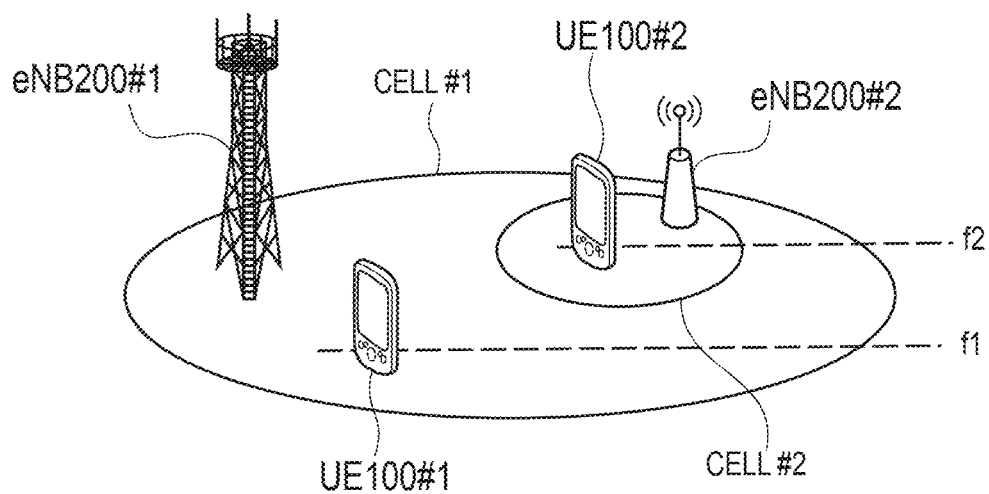
FIG. 7 is a diagram illustrating an operation environment according to the first embodiment.
Figure 8:
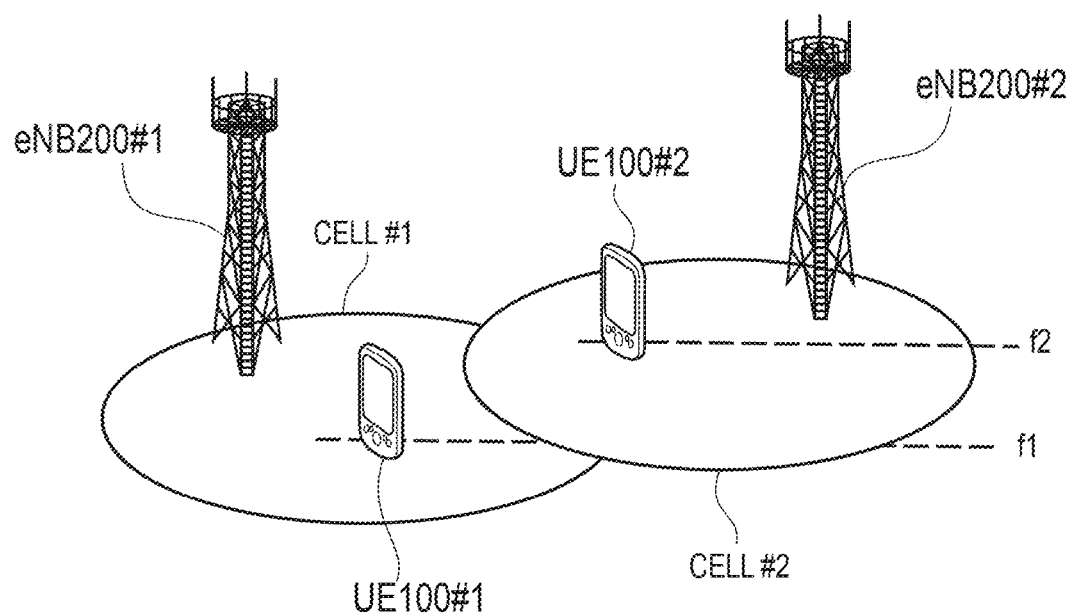
FIG. 8 is a diagram illustrating an operation environment according to the first embodiment.

An operation environment according to the first embodiment will be described, below. FIG. 6 to FIG. 8 are diagrams illustrating an operation environment according to the first embodiment. As illustrated in FIG. 6 to FIG. 8, there are three options for an operation environment according to the first embodiment.

The three operation environments illustrated in FIG. 6 to FIG. 8 have the following in common:

A UE 100#1 exists in a cell #1. The UE 100#1 is in an RRC connected state or an RRC idle state in the cell #1. For the UE 100#1, the cell #1 is a serving cell and a cell #2 is a neighboring cell.

A UE 100#2 exists in the cell #2. The UE 100#2 is in an RRC connected state or an RRC idle state in the cell #2. For the UE 100#2, the cell #1 is a neighboring cell and the cell #2 is a serving cell.

In a first operation environment, as illustrated in FIG. 6, an eNB 200#1 forms the cell #1 operating at a frequency f1 and the cell #2 operating at a frequency f2.

In a second operation environment, as illustrated in FIG. 7, the eNB 200#1 forms the cell #1 operating at the frequency f1, and an eNB 200#2 forms the cell #2 operating at the frequency f2. The eNB 200#2 is a pico cell or a femto cell, and a coverage of the cell #2 overlaps a coverage of the cell #1. A whole of the coverage of the cell #2 may overlap the coverage of the cell #1, or a part of the coverage of the cell #2 may overlap the coverage of the cell #1.

In a third operation environment, as illustrated in FIG. 8, the eNB 200#1 forms the cell #1 operating at the frequency f1, and the eNB 200#2 forms the cell #2 operating at the frequency f2. The eNB 200#2 is a macro cell and the cell #2 is arranged by partially overlapping with the cell #1.

In the first embodiment, in such an operation environment, a scenario is assumed where the Inter-cell discovery is performed in which the UE 100#1 discovers the UE 100#2. In such an operation environment, even when the UE 100#1 transmits the discovery signal at the frequency f1 in the Inter-cell discovery, the frequency of the cell #2 in which the UE 100#2 exists is the frequency f2, and thus, the UE 100#2 is not capable of receiving the discovery signal.

Therefore, in the first embodiment, the UE 100#1 uses the radio resources of the frequency f2 different from the frequency f1 to transmit the discovery signal for discovering the UE 100#2 that exists in the cell #2 different from the cell #1. Here, it should be noted that the radio resources of the frequency f2 are radio resources used exclusively for an uplink.

Here, it is preferable that the UE 100#1 uses synchronization information used in the cell #1 to transmit the discovery signal. In other words, it is preferable that the UE 100#1 transmits the discovery signal at a timing synchronized with the eNB 200#1 forming the cell #1.

Further, the UE 100#1 may transmit, to the eNB 200#1 forming the cell #1, an assignment request for requesting an assignment of the radio resources of the frequency f2. The eNB 200#1 assigns radio resources of the frequency f2 to the UE 100#1, as radio resources (resource pool) available for the D2D proximity service, in response to a signal received from the UE 100#1.

In such a scenario, there may be two options as an option in which the UE 100#1 uses the radio resources of the frequency f2.

In a first option, the radio resources of the frequency f2 are configured as radio resources of a secondary cell of the UE100#1 when the cell #1 is configured as a primary cell of the UE 100#1. The secondary cell is operating at the frequency f2, is dedicated to the uplink, and is configured by the eNB 200#1 forming the cell #1. It should be noted that in the first option, the eNB 200#1 forming the cell #1 does not need to provide the uplink and the downlink at the frequency f2. That is, the secondary cell may be a cell used exclusively for the Inter-cell discovery. However, the first option is not limited thereto, and the eNB 200#1 may form a cell operating at the frequency f2.

In a second option, the radio resources of the frequency f2 is scheduled by downlink control information (DCI: Downlink Control Information) dedicated to the D2D proximity service. The downlink control information is transmitted from the eNB 200#1 forming the cell #1. It is noted that, the downlink control information is transmitted by using the frequency f1. It should be noted that in the second option, the eNB 200#1 forming the cell #1 does not need to provide the uplink and the downlink at the frequency f2. That is, the secondary cell may be a cell used exclusively for the Inter-cell discovery. However, the second option is not limited thereto, and the eNB 200#1 may form a cell operating at the frequency f2.

(4) Operation According to First Embodiment

An operation according to the first embodiment will be described, below. The above-described first option and second option will be described, below.

(4.1) First Option

Figure 9:
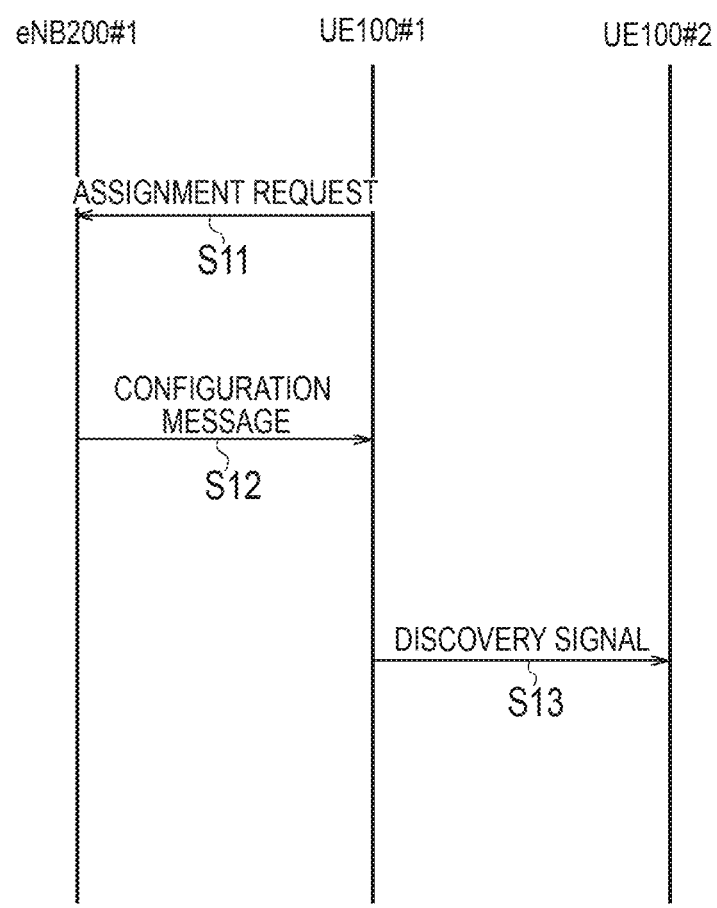
FIG. 9 is a sequence diagram illustrating an operation according to the first embodiment.

FIG. 9 is a sequence diagram illustrating the first option according to the first embodiment. It should be noted that in FIG. 9, the operation environment illustrated in FIG. 6 is a prerequisite.

As illustrated in FIG. 9, in step S11, the UE 100#1 transmits, to the eNB 200#1 forming the cell #1, an assignment request for requesting an assignment of the radio resources of the frequency f2.

In step S12, the eNB 200#1 transmits, to the UE 100#1, a message (Configuration message) for configuring a secondary cell of the UE 100#1, when the cell #1 is configured as a primary cell of the UE 100#1. As described above, it should be noted that the eNB 200#1 forming the cell #1 does not need to provide the uplink and the downlink at the frequency f2.

That is, the eNB 200#1 assigns, as radio resources used exclusively for the D2D proximity service (radio resource used exclusively for the uplink), radio resources of the frequency f2, to the eNB 200#1. In the first embodiment, the radio resources of the frequency f2 are used for transmitting a discovery signal for discovering the UE 100#2 that exists in the cell #2 (frequency f2) different from the cell #1 (frequency f1), in the D2D proximity service.

In step S13, the UE 100#1 uses radio resources of the frequency f2 different from the frequency f1 to transmit a discovery signal for discovering the UE 100#2 that exists in the cell #2 different from the cell #1. As described above, it is preferable that the UE 100#1 uses the synchronization information used in the cell #1 to transmit the discovery signal.

It is noted that the process in step S11 is not requisite, and the eNB 200#1 may transmit the Configuration message to the UE 100#1 on the basis of another trigger.

(4.2) Second Option

Figure 10:
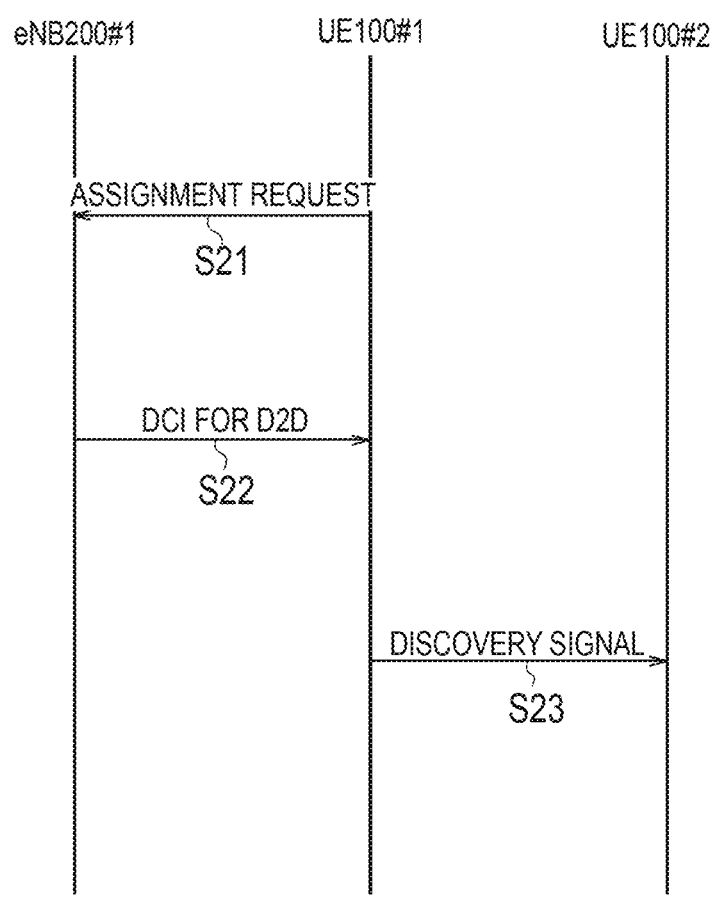
FIG. 10 is a sequence diagram illustrating an operation according to the first embodiment.

FIG. 10 is a sequence diagram illustrating the second option according to the first embodiment. It should be noted that in FIG. 10, the operation environment illustrated in FIG. 6 is a prerequisite.

As illustrated in FIG. 10, in step S21, the UE 100#1 transmits, to the eNB 200#1 forming the cell #1, an assignment request for requesting an assignment of radio resources of the frequency f2.

In step S22, the eNB 200#1 transmits, to the UE 100#1, the downlink control information (DCI: Downlink Control Information) dedicated to the D2D proximity service. The downlink control information is information for scheduling the radio resources of the frequency f2. As described above, it should be noted that the eNB 200#1 forming the cell #1 does not need to provide the uplink and the downlink at the frequency f2.

That is, the eNB 200#1 assigns, as radio resources used exclusively for the D2D proximity service (radio resource used exclusively for the uplink), radio resources of the frequency f2, to the eNB 200#1. In the first embodiment, the radio resources of the frequency f2 are used for transmitting a discovery signal for discovering the UE 100#2 that exists in the cell #2 (frequency f2) different from the cell #1 (frequency f1) in the D2D proximity service.

In step S23, the UE 100#1 uses radio resources of the frequency f2 different from the frequency f1 to transmit a discovery signal for discovering the UE 100#2 that exists in the cell #2 different from the cell #1. As described above, it is preferable that the UE 100#1 uses the synchronization information used in the cell #1 to transmit the discovery signal.

It is noted that the process in step S21 is not requisite, and the eNB 200#1 may transmit, to the UE 100#1, the configuration message on the basis of another trigger.

(5) Operation and Effect

In the first embodiment, a new concept of "radio resource of the second frequency used exclusively for an uplink" is introduced, and the UE 100#1 transmits a discovery signal by using radio resources of the frequency f2. As a result, even in a case where the frequency employed in the first cell and the frequency employed in the second cell differ, the UE 100#2 is capable of receiving the discovery signal to enable appropriate execution of the Inter-cell discovery.

First Modification

A first modification of the first embodiment will be described below. The description proceeds with a particular focus on a difference from the first embodiment.

Specifically, in the first embodiment, the UE 100#1 uses radio resources of the frequency f2 to transmit a discovery signal. On the other hand, in the first modification, through the transmission of a D2D interest indication indicating that the UE has an interest in the D2D proximity service, the frequencies of cells in which a plurality of UEs 100 exist are matched with the frequency at which the D2D proximity service is provided.

Here, in the first modification, a case is provided as an example where the D2D proximity service is not provided at the frequency f2, and the D2D proximity service is provided at the frequency f1. In such a case, a procedure is described in which the cell #2 in which the UE 100#2 exists is changed to a cell operating at the frequency f1. Thus, it should be noted that the first modification is a scenario in which the D2D proximity service does not need to be provided at all the frequencies provided in the mobile communication system (WAN; Wide Area Network). In other words, it should be noted that the UE 100 does not need to support the D2D proximity service at all the frequencies provided in the mobile communication system (WAN; Wide Area Network). The frequency at which the D2D proximity service is supported may differ depending on each UE 100.

It is noted that in the first operation environment (see FIG. 6), the cell operating at the frequency f1 is a cell provided by the eNB 200#1. In the second operation environment (see FIG. 7), the cell operating at the frequency f1 may be a cell provided by the eNB 200#1 and may be a cell provided by the eNB 200#1. In a third operation environment (see FIG. 8), the cell operating at the frequency f1 is a cell provided by the eNB 200#2.

Figure 11:
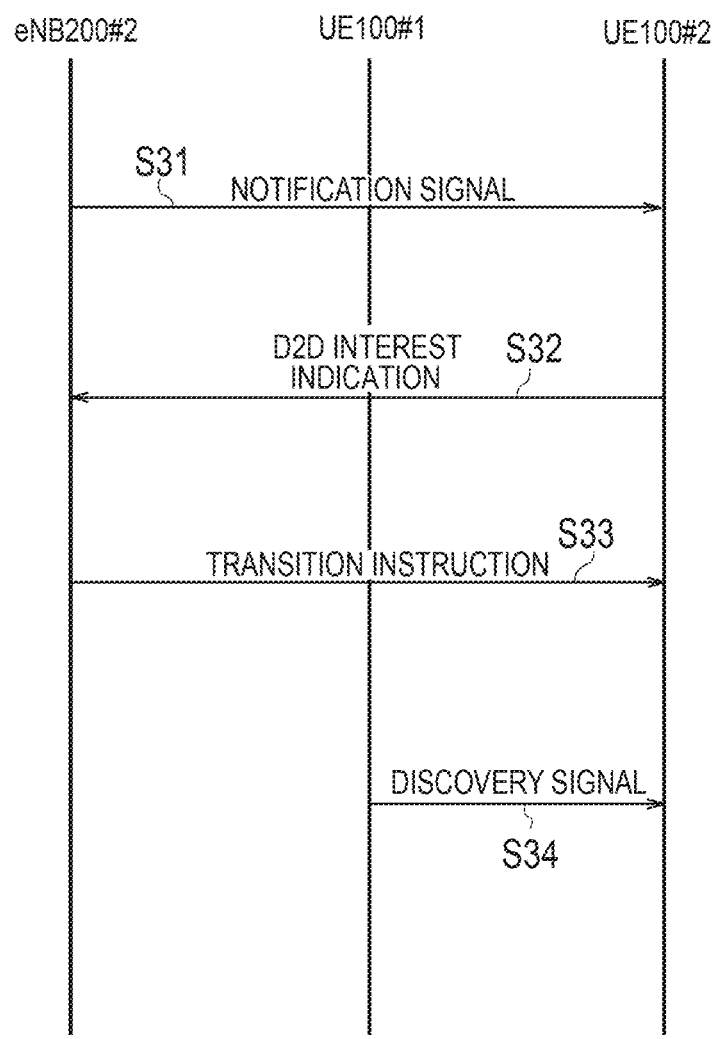
FIG. 11 is a sequence diagram illustrating an operation according to a first modification.

More particularly, as illustrated in FIG. 11, in step S31, the eNB 200#2 notifies (broadcasts) information indicating the frequency at which the D2D proximity service is provided. Such information is notified by an SIB (System Information Block), for example.

In step S32, the UE 100#2 transmits, to the eNB 200#2, the D2D interest indication (D2D Interest Indication) that indicates an interest in the D2D proximity service. The UE 100#2 may refer to the information received in step S31 and transmit the D2D interest indication to the eNB 200#2 when the D2D proximity service is not provided at the frequency f2. In other words, the UE 100#2 may transmit the D2D interest indication to the eNB 200#2 when existing on the cell (frequency) in which the D2D proximity service is not provided. However, the first modification is not limited thereto, and the UE 100#2 may transmit the D2D interest indication to the eNB 200#2 without referring to the information received in step S31.

In step S33, the eNB 200#2 transmits, to the UE 100#2, a message (transition instruction) for instructing a transition from the frequency f2 (the cell #2) to the frequency f1 (a cell operating at the frequency f1). When the UE 100#2 is in an RRC connected state, the transition instruction is a handover instruction from the cell #2 to a cell operating at the frequency f1. On the other hand, when the UE 100#2 is in an RRC connected state and the UE 100#2 is transitioned to an RRC idle state after the D2D interest indication is transmitted, the transition instruction may be a cell change instruction (Cell Change Order) from the cell #2 to the cell operating at the frequency f1. In such a case, the eNB 200#2 transmits, to the UE 100#2, for example, the cell change instruction (Cell Change Order) as well as an RRC connection release message (RRC Connection Release).

It should be noted that the D2D interest indication is transmitted in an RRC connected state, and thus, in step S33, it is highly probable that the UE 100#2 is in an RRC connected state.

Further, it should be noted that in step S33, the UE 100#2 performs transition (handover or cell reselection) to the frequency f1 in which the D2D proximity service is provided.

In step S34, the UE 100#2 scans the discovery signal at the frequency f1. As a result, the UE 100#2 is capable of receiving the discovery signal transmitted from the UE 100#1.

Here, the D2D interest indication may include information indicating a type of D2D proximity services in which the UE 100#1 is interested. A type of D2D proximity services may include information indicating whether or not the Inter-cell communication is desired and information indicating a type of UEs 100 in which the Inter-cell communication should be performed.

(Operation and Effect)

In the first modification, a new concept of a "D2D interest indication indicating an interest in the D2D proximity service" is introduced, and the UE 100#2 transmits the D2D interest indication to the eNB 200#2 forming the cell #2. In other words, the eNB 200 is provided with decision-making information for performing a transition (handover or cell reselection) of the UE 100 relative to the frequency at which the D2D proximity service is provided. Therefore, even when the frequencies of the cells on which a plurality of UEs 100 exist differ from one another, it is possible to match the frequencies of the cells on which the plurality of UEs 100 exist to a frequency (here, the frequency f1) in which the D2D proximity service is provided, and it is possible to appropriately perform the Inter-cell discovery.

Second Modification

A second modification of the first embodiment will be described, below. The description proceeds with a particular focus on a difference from the first modification.

Specifically, in the first modification, a case is described where the UE 100#2 transmits the D2D interest indication when the D2D proximity service is not provided at the frequency f2 and the D2D proximity service is provided at the frequency f1.

On the other hand, in the second modification, a case is provided, as an example, where the D2D proximity service is not provided at the frequency f1 and the D2D proximity service is provided at the frequency f2. Further, it should be noted that the eNB 200#1 forms a cell operating at the frequency f2 in addition to the cell #1 operating at the frequency f1.

Here, it should be noted that the second modification is a scenario in which the D2D proximity service does not need to be provided at all the frequencies provided in the mobile communication system (WAN; Wide Area Network), similarly to the first modification. In other words, it should be noted that the UE 100 does not need to support the D2D proximity service at all the frequencies provided in the mobile communication system (WAN; Wide Area Network). The frequency at which the D2D proximity service is supported may differ depending on each UE 100.

In such a case, in the second modification, the UE 100#1 transmits the D2D interest indication to the eNB 200#1 forming the cell #1. The UE 100#1 may transmit the D2D interest indication to the eNB 200#1 when existing on the cell (frequency) in which the D2D proximity service is not provided.

Here, the eNB 200#1 that receives the D2D interest indication preferably transmits, to the UE 100#1, a message (transition instruction) for instructing a transition from the frequency f1 to the frequency f2, as described in a third modification described later. The UE 100#1 that receives the transition instruction preferably performs transition (handover or cell reselection) to the frequency f2 in which the D2D proximity service is provided, as described in the third modification described later.

As a result, similarly to the first modification, even when the frequencies of the cells on which a plurality of UEs 100 exist differ from one another, it is possible to match the frequency of the cell on which the plurality of UEs 100 exist to a frequency (here, the frequency f2) in which the D2D proximity service is provided, and it is possible to appropriately perform the Inter-cell discovery.

It is noted that in the second modification, the information indicating the frequency at which the D2D proximity service is provided preferably is notified from the eNB 200#1. Such information is notified by an SIB (System Information Block), for example.

Third Modification

A third modification of the first embodiment will be described, below. The description proceeds with a particular focus on a difference from the first embodiment and the second modification.

Specifically, in the first embodiment, an assignment process of the radio resources of the frequency f2 (step S12 or step S22) is triggered by transmission of an assignment request for requesting assignment of the radio resources of the frequency f2 from the UE 100#1 to the eNB 200#1.

On the other hand, in the third modification, the assignment process of the radio resources of the frequency f2 (step S12 or step S22) is triggered by transmission of the D2D interest indication from the UE 100#1 to the eNB 200#1.

Figure 12:
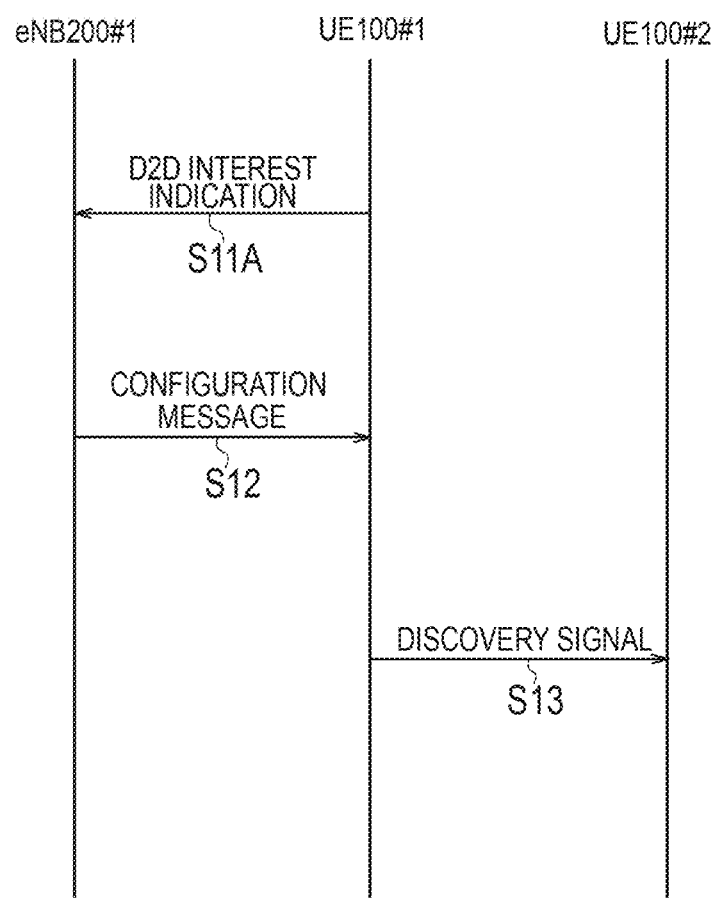
FIG. 12 is a sequence diagram illustrating an operation according to a third modification.
Figure 13:
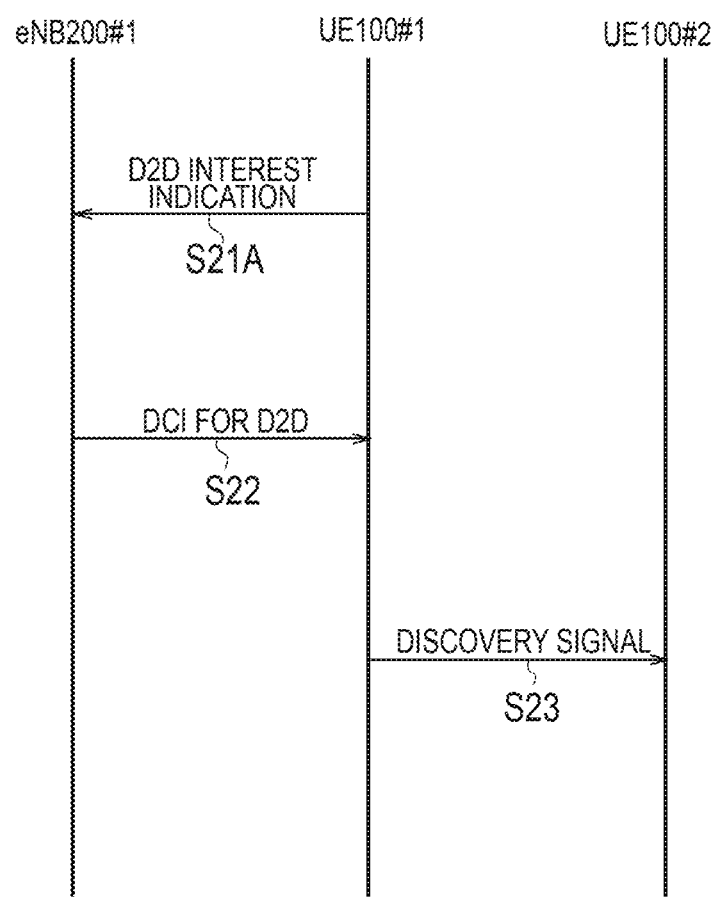
FIG. 13 is a sequence diagram illustrating an operation according to the third modification.

That is, in the above-described first option, as illustrated in FIG. 12, a process in step S11A is performed instead of step S11 illustrated in FIG. 9. In step S11A, the UE 100#1 transmits, to the eNB 200#1, the D2D interest indication indicating an interest in the D2D proximity service. Likewise, in the above-described second option, as illustrated in FIG. 13, a process in step S21A is performed instead of step S21 illustrated in FIG. 10. In step S21A, the UE 100#1 transmits, to the eNB 200#1, the D2D interest indication indicating an interest in the D2D proximity service.

Fourth Modification

A fourth modification of the first embodiment will be described, below. The description proceeds with a particular focus on a difference from the first embodiment.

Specifically, in the first embodiment, the radio resources used exclusively for the uplink are the radio resources used exclusively for the D2D proximity service.

On the other hand, in the fourth modification, radio resources used exclusively for the uplink are used for transmitting a signal used for informing the existence of the UE 100, to the eNB 200 that manages a cell (for example, a pico cell or a femto cell) having a coverage narrower than a coverage of a cell (for example, a macro cell) on which the UE 100 exists.

Figure 14:
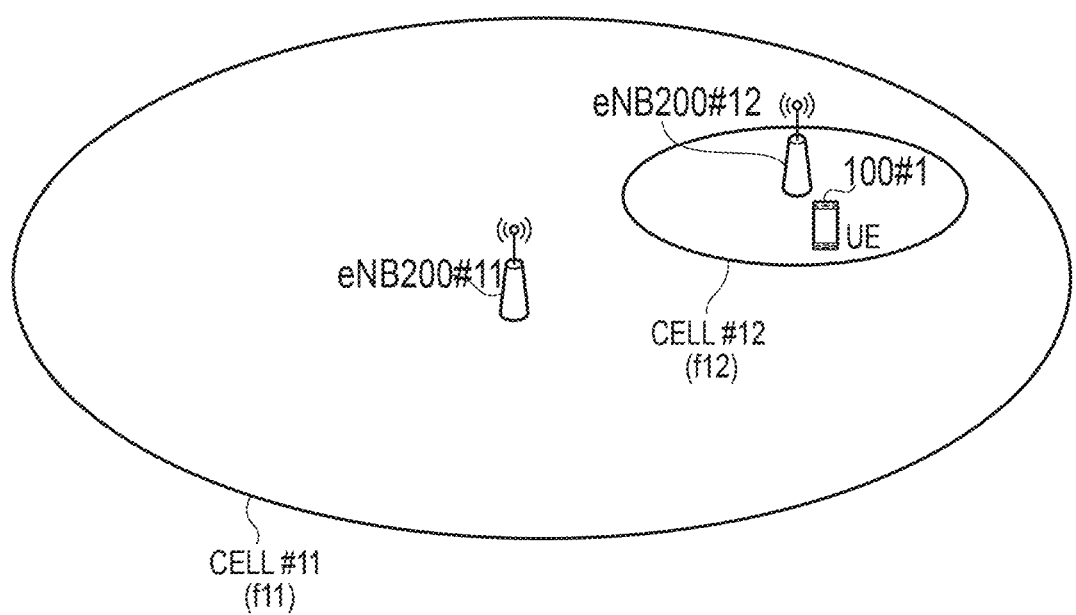
FIG. 14 is a diagram illustrating an operation environment according to a fourth modification.

More particularly, as illustrated in FIG. 14, an eNB 200#11 forms a cell #11 (for example, a macro cell) operating at a frequency f11. An eNB 200#12 forms a cell #12 (for example, a pico cell or a femto cell) operating at a frequency f12. The cell #12 has a coverage narrower than a coverage of the cell #11. The coverage of the cell #12 overlaps the coverage of the cell #11. The UE 100#1 exists in the cell #11.

In such an operation environment, the eNB 200#11 assigns the radio resources of the second frequency f12 different from the frequency f11, to the UE 100#1 that exists in the cell #11. The radio resource of the second frequency f12 are used for transmitting a signal used for informing the existence of the UE 100#1, to the eNB 200#12 forming the cell #12.

Here, as an example of such a signal, an RACH signal may be used. When the UE 100#1 uses the radio resources of the second frequency f12 to transmit the RACH signal, it becomes possible for the UE 100#1 to inform the eNB 200#12 forming the cell #12 of the existence of the UE 100#1.

Other Embodiments

The present disclosure is explained through the above-described embodiments, but it must not be understood that this disclosure is limited by the statements and the drawings constituting a part of this disclosure. From this disclosure, various alternative embodiments, examples, and operational technologies will become apparent to those skilled in the art.

For example in other embodiments, the UE 100 preferably transmits the D2D interest indication when the D2D function is turned on. The D2D function is a function of receiving the D2D proximity service, and on/off of the D2D function is switched by a user operation, for example. On/off of the D2D function may be switched depending on whether or not the UE 100 exists in a cell provided by a mobile communication system (WAN; Wide Area Network) rather than through the user operation.

For example in other embodiments, the D2D proximity service may be provided at a plurality of frequencies. In such a case, the eNB 200 may select the frequency at which the D2D proximity service should be provided out of a plurality of frequencies, in response to reception of the D2D interest indication. For example, the eNB 200 may select a frequency at which the D2D proximity service should be provided, in accordance with a congestion situation of each frequency and an interference situation of each frequency. Alternatively, the eNB 200 may select a frequency at which the D2D proximity service should be provided in accordance with a combination of UEs 100 that receive the D2D proximity service when the D2D proximity service is performed in unicast. As a result, it is possible to perform scheduling in accordance with a combination of UEs 100 that receive the D2D proximity service.

For example in other embodiments, the D2D interest indication may include information indicating a frequency used for transmitting a discovery signal, information indicating a frequency used for receiving a discovery signal, or information indicating a frequency used for exchanging a discovery signal. The frequency used for transmitting a discovery signal and the frequency used for receiving a discovery signal may differ from each other.

For example in other embodiments, a program may be provided for causing a computer to execute each process performed by the UE 100 and the eNB 200. Furthermore, the program may be recorded on a computer-readable medium. By using the computer-readable medium, it is possible to install the program in a computer. Here, the computer-readable medium recording the program thereon may include a non-transitory recording medium. The non-transitory recording medium is not particularly limited. For example, the non-transitory recording medium may include a recording medium such as a CD-ROM or a DVD-ROM.

Alternatively, a chip may be provided which is configured by: a memory in which a program for performing each process performed by the UE 100 and the eNB 200 is stored; and a processor for executing the program stored in the memory.

In the embodiments, the LTE system is described as an example of the mobile communication system. However, the embodiments are not limited thereto. The mobile communication system may be a system other than the LTE system.

Additional Statements

Below, supplementary notes of the embodiments will be additionally described.

(1. Introduction)

The below additional statements provide analysis about inter-frequency discovery.

(2. Deployment Scenario for Inter-Frequency Discovery)

Possible deployment scenario for inter-frequency discovery is illustrated in FIG. 6 to FIG. 8, where UE 1 is camped on/connected to Cell 1 operating on f1, and UE 2 is camped on/connected to Cell 2 operating on f2. The eNBs operating Cell 1 or Cell 2 may/may not operate SCell on f2 or f1.

The scenario can be categorized into three cases depending on whether intra-eNB/homogeneous network (HomoNet), inter-eNB/heterogeneous network (HetNet) and inter-eNB/HomoNet is deployed. These cases are depicted in FIG. 6 to FIG. 8, respectively. Actual deployments may consist of a combination of the categorized cases.

For the intra-eNB/HomoNet case depicted in FIG. 6, it may include intra-eNB carrier aggregation (CA) deployment, i.e. the UEs are CA-capable but the PCells are configured with different frequencies, i.e. UE 1's PCell is Cell1 on f1 and UE 2's PCell is Cell 2 on f2. The simplest case is, for example, the SCell for UE 1 is configured with Cell 2, and eNB 1 allows D2D operations on Cell 2. In this case, UE 1 and UE 2 will be able to perform D2D over f2 without too much problem.

For the inter-eNB/HetNet case, in FIG. 7, D2D operation is a slightly more complex since the RRC connections of the UEs are established over different eNBs. If UE 2 is assumed as dual connectivity (DC)-capable UE and configured with f1 for RRC connection and with f2 for secondary resource, then UE 2 will be able to perform D2D with UE 1 over f1 since UE1 is only served on f1.

The common point in the two cases above is that both UEs have possibilities to be provided a common coverage cell on a frequency. Therefore, one way to support inter-frequency discovery is to ensure that all D2D UEs are served under the same overlaid cell under the same frequency.

Observation 1: If D2D UEs are served under the same overlaid cell, inter-frequency discovery can be easily supported.

For the inter-eNB/HomoNet case, as depicted in FIG. 8, D2D operation will involve the most complicated network planning, since there isn't an overlaid layer for both D2D UEs and standardized coordination over X2 is disallowed in Rel-12.

Note that for synchronous deployment, Cell 1 and Cell 2 are assumed to be time synchronized. The issue with D2D synchronization under the asynchronous deployment is discussed separately.

Proposal 1: it should assumed that at least for Rel-12 that the UEs attempting inter-frequency discovery are provided with at least an overlaid cell operated on one frequency.

Up to now, RAN2 has not discussed the case whereby only a subset of the deployed operating frequencies may support D2D discovery. Although this may be considered as eNB implementation or operator's preference, this does have an impact on inter-frequency, inter-cell discovery. For example, assuming the case with three operating frequencies, the support for D2D may be categorized into three plans as shown in Table 1.

TABLE 1

| Plan | f1 (e.g. 800 MHz) | f2 (e.g. 2 GHz) | f3 (e.g. 3.5 GHz) | Note |
|---|---|---|---|---|
| 1 | D2D/WAN | D2D/WAN | D2D/WAN | Assume D2D demands growth |
| 2 | D2D/WAN | D2D/WAN | WAN only | |
| 3 | D2D/WAN | WAN only | WAN only | Assume initial deployments |

Plan 1 assumes all of the operating frequencies allow D2D operation which may or may not include D2D discovery or D2D communication. Plan 2 assumes two of the three operating frequencies allow D2D operation. These two plans above will require some mechanism for inter-frequency discovery.

With plan 3, only a single frequency supports D2D operation and it may be considered as just an intra-frequency scenario. However, in the plan 3 scenario, it is assumed that not all D2D UEs are initially served by the cell(s) on the same frequency; therefore, some mechanism(s) may be needed to ensure that all D2D UEs can operate D2D on the one frequency available for D2D.

As the main purpose for inter-frequency discovery is to enable the UE to be served under a D2D allowable frequency, the assumption is that the UE's current serving frequency may not be one of the D2D allowable frequencies. In order to assist the UE in tuning to the proper frequency for monitoring/transmitting D2D discovery, it should be possible for the non-D2D serving cell to provide the list of neighboring frequencies that do support D2D. This is similar to the scenario for MBMS whereby both MBMS and non-MBMS cells indicate in SIB15 the MBMS SAIs of the current frequency and of each neighbor frequency.

Proposal 2: D2D allowable frequencies should be provided by the SIB of the serving cell, regardless of whether the serving cell allows D2D operation.

(3. Transmission and Reception Scheme Alternatives)

Taking into account the possible deployment scenario, inter-frequency discovery may be accomplished with one or more of the three alternatives below.

ALT 1: UE 1 transmits a discovery signal on f1, then UE 2 receives the signal on f1, i.e. inter-frequency discovery cell reception mechanism. In this alternative, UE 2 is assumed to have at least a receiver for both frequencies. For more efficient operation, it may be assumed that the UE has dual receivers and/or Carrier Aggregation capabilities.

ALT 2: UE 1 transmits a discovery signal on f2, e.g. inter-frequency discovery transmission mechanism, then UE 2 receives the signal on f2. In this alternative, UE 1 may be assumed to have at least a transmitter for both frequencies. For more efficient operation, it may be assumed that the UE has dual transmitters and/or Carrier Aggregation capabilities.

ALT 3: UE 1 transmits a discovery signal on f1, then UE 2 receives the signal on f1 after it is handed over to f1. In this alternative, the eNB operating Cell 2 is assumed to have another cell that can be operated on f1.

ALT 1 is a straightforward scheme since Cell 1 allocates only resources within its own operating frequency to UE 1 for the transmission of discovery signals, while UE 2 will need to receive the discovery signal on a frequency different from the serving frequency.

ALT 2 has the potential for more flexibility in network planning, assuming the multi-carrier D2D operation is supported, e.g. plan 1 in Table 1. While the benefit is expected for D2D communication, especially for the unicast case, for Rel-12 this alternative only results in unnecessary complexity, since the discovery and the 1:many D2D communication are assumed for the broadcast transmission/reception, i.e. the transmitted signal should be received by all D2D-enabled UEs within range.

ALT 3 is actually a mechanism to try and reuse the intra-frequency D2D discovery as much as possible under the multi-frequency deployment scenario. Due to the reuse of existing intra-frequency D2D discovery mechanism, ALT 3 may result with the least impact to the UE, since D2D discovery is only performed on the common frequency which allows D2D operation, i.e. plan 3 in Table 1.

Proposal 3: RAN2 should preclude the scheme for the discovery signal to be transmitted on a frequency different from the serving frequency for Rel-12.

(4. Details of the Scheme Alternatives)
(4.1. ALT 1 Details)
(4.1.1. Reception of Inter-Frequency Discovery Signals)

For the intra-frequency discovery, both intra-cell and inter-cell scenarios have been discussed in RAN2 and several agreements were reached during the study item phase. Some discussions have also started under the work item phase. As for inter-cell discovery, RAN2 reached the following agreement on D2D reception discovery resources.

The eNB may provide D2D reception discovery resources in SIB. These may cover resources used for D2D transmission in this cell as well as resources used in neighbor cells.

In addition, RAN1 agreed with the following aspects.

Confirm that radio resources pool(s) may be provided by eNB for D2D UEs in SIB for discovery reception for Type-2B (if supported). It needs further study whether the common reception pool(s) or different reception pools for type 1 and Type-2B discovery. A UE is not required to decode neighboring cell SIB.

Mechanisms for Type-2B discovery. A resource hopping mechanism following the resource allocation by eNB can be applied. Details of resource hopping mechanism should be studied.

The agreements above intended that the SIB transmitted from the serving cell provides the information to UEs for reception of inter-cell discovery signals. Therefore, the UE can receive the signals without decoding any SIB transmitted from the neighbour cells.

Observation 2: With the reception pool(s) provided by the SIB from the UE's serving cell, the UE may receive the discovery signal without decoding the neighbour cells's SIB.

The term "neighbour cell" typically includes a neighbour cell on the same frequency as well as on a different frequency. However, the discussions towards the above agreement for resource allocation in RAN2 have not clearly considered the inter-frequency discovery scenario. Therefore, the details should be discussed and defined.

Assuming the agreements includes the neighbour cells on different frequencies, the SIB transmitted by the serving cell should include D2D discovery resources on the serving frequency and neighbour frequencies. With the available discovery resources provided over SIB, D2D UEs will be able to receive D2D discovery signals from UEs on a neighbouring inter-frequency cell. We assume it may be possible to add some extension parameters to the information element (IE) to be defined for inter-cell discovery and to re-use existing inter-frequency measurement mechanism, to support inter-frequency discovery using ALT 1.

Proposal 4: As the baseline, RAN2 should consider re-using existing inter-frequency measurement mechanism for inter-frequency discovery, in a case where ALT 1 is supported in Rel-12.

(4.1.2. Possible Issues)

(4.1.2.1. Measurement Gap Length and Triggering)

According to the table 10.1-2 in the TR, RAN1 assumed 16-64 subframes per discovery period for performance evaluation in the study phase. For inter-frequency measurements, the existing measurement gap length is fixed at 6 subframes. Without any further enhancement, the detection probability for discovery, i.e. the opportunity to discover D2D UEs would be degraded to at least ⅓.

With respect to the timing of the configuration of measurement gaps, the relationship between RRM related measurements (i.e., RSRP/RSRQ) of the eNBs and the received discovery signal power from the other D2D UEs may not be directly correlated. In other words, a D2D UE may receive discovery signals from D2D UEs in a neighbour cell even though the D2D UE is nowhere close to the neighbour cell. Considering the inter-frequency discovery with ALT 1, there is no reason to deny the D2D UE from the continuous monitoring of D2D discovery, although the decision to assign gaps of discovery should be left for eNB implementation. If D2D UEs have no interest in receiving/transmitting D2D discovery, the D2D UEs should inform the serving eNB of the status of its D2D operation; i.e., whether D2D operation is disabled by the user.

Observation 3: In a case when the existing mechanism for inter-frequency measurement is re-used, the detection probability will be degraded.

Observation 4: While RRM related measurements of the eNBs and the received discovery signal power from the other D2D UEs may not be directly correlated, it should be the eNB responsibility to assign the UE with gaps to monitor inter-frequency discovery signal.

Based on Observation 3, it could be considered whether additional enhancements are needed for inter-frequency discovery e.g., to define a new "discovery monitoring gap" with larger number of subframes than the existing measurement gap length.

However, it will result in less opportunity for WAN UL/DL transmissions on the camped/served frequency, while the detection probability of discovery will improve.

Observation 5: If the gap is enhanced for inter-frequency discovery, a UE will lose the opportunity for cellular operations, due larger number of inter-frequency monitoring and/or longer discovery subframes.

Proposal 5: RAN2 should take into account the trade-off between the detection probability of discovery and the opportunity of WAN UL/DL transmissions, in case ALT 1 is supported.

To reduce the impact of the trade-off above, the simultaneous operation of inter-frequency measurement and inter-frequency discovery should be considered, for the case where the inter-frequency neighbouring cells for discovery are the same cells or a part of the cells for handover, i.e. for normal cellular operation. Since the inter-frequency measurement needs a DL receiver and does not require a UL transceiver, i.e. D2D receiver is free during the gap; therefore, the UE can receive discovery signal during the same gap.

Observation 6: Inter-frequency monitoring of discovery signals may be performed during existing measurement gap and performed together with inter-frequency measurement simultaneously.

Proposal 6: As the baseline, if ALT 1 is chosen, RAN2 should assume inter-frequency monitoring of discovery signals is performed together with existing inter-frequency measurement using the same measurement gap.

(4.1.2.2. UE Capability)

Thus far we have assumed that UEs with a single D2D transceiver would only have the capability to operate on one frequency at any given time, regardless of number of supported frequencies for WAN communication as indicated in the plans in Table 1.

Note that the frequencies for WAN communication mean carriers including intra-band and inter-band.

Observation 7: The D2D transceiver should not be assumed to work on all frequencies supporting WAN communication.

To facilitate more flexible use of D2D, CA-capable UEs may be considered for inter-frequency discovery. In this case, the CA-capable UEs can transmit/monitor discovery signals on PCell and SCells simultaneously. Therefore, the "discovery monitoring gap" will not be needed for such a UE as long as the D2D discovery frequency belongs to one of frequencies of the UE's serving cells (i.e., PCell or SCell).

Observation 8: For carrier aggregation capable UEs, inter-frequency discovery can be performed without assigning measurement gaps, as long as the D2D discovery frequency belongs to one of frequencies of the UE's serving cells (4.2. ALT 3 Details)

(4.2.1. Handover Procedure for D2D Discovery)

Alternative 3 is mainly applicable to plan 2 or 3 in Table 1, i.e., not all cellular frequencies support D2D. This alternative assumes handover is completed before discovery is initiated. In particular, if a D2D-enabled UE is served on a frequency that does not support D2D operation, the eNB should handover the UE to a target cell operating on a D2D allowable frequency.

The potential benefits are as follows.

If the SIB provided on the frequency not allowing D2D operation does not include any D2D-related information, e.g. discovery reception resources, then the UE camped/served on the frequency has no way to transmit/receive discovery signals on the different frequency. This is a likely scenario for stand-alone small cell deployment, e.g. the case in FIG. 7, since currently there is no agreement whether the non D2D operating cell shall provide the D2D-related information in its SIB.

Even if D2D discovery resources are provided in a SIB for a cell not supporting D2D, the cell will not be able to allocate Type-2B discovery resource to the UE since the cell does not support any D2D operations.

Observation 9: If the frequency of the UE's serving cell does not allow D2D operation, the UE may lose the opportunity to initiate D2D discovery.

However, it also has some drawbacks.

If multiple frequencies support D2D operation, ALT 3 should be combined with ALT 1 or ALT 2.

If all of D2D-capable UEs are served on limited frequencies which support D2D operation, it may result in congestion on the frequencies.

(4.2.2. Possible Issues)

(4.2.2.1. Trigger to Handover for Discovery)

In a case all D2D-capable UEs are served on the same cell, e.g. the plan 3 in Table 1, the cell may suffer from congestion, e.g. less opportunity for load balancing in WAN communication brought by multiple frequency deployment. To avoid this issue, only D2D-enabled UEs, which are a part of D2D-capable UEs, should be considered to be handed over to the D2D allowed cell, and when the UE disables D2D then it should be up to eNB implementation to decide whether the D2D-disabled UE remains in the cell or is handed over to the other cell, based on e.g. current load in the cell.

Observation 10: When the UE enables D2D functionality, the eNB may handover the UE to a cell which allows discovery.

According to the TR of SA1, the discovery feature can be enabled/disabled by a user as follows.

5.1.1.5 Potential Requirements. General. [PR.1] Based on operator policy and user choice, the proximity of two ProSe-enabled UEs shall be determinable; for example, using direct radio signals or via the operator network. [ . . . ] [PR.3] Operator policy and user choice can set the ProSe feature of: [ . . . ] a ProSe-enabled UE to disable the ability to be discoverable by other UEs and to disable the ability to discover other UEs; [ . . . ] [PR.97] Operator policy disabling or limiting individual ProSe features shall override any user choice. [ . . . ]

Thus, whether the UE enables discovery functionality will depend on user preference. We assume D2D-capable UE will support a user interface to allow the user to enable/disable the discovery functionality.

Observation 11: Whether the UE enables discovery functionality will depend on user preference.

In this case, eNB should have a capability to know whether the UE enables its discovery function or not. In our view, this use case is very similar with the concept of the existing MBMS interesting indication indicating an interest for MBMS, therefore, we propose to introduce an MBMS-like solution to trigger inter-frequency handover, i.e. using "D2D interest indication".

Proposal 7: The UE should have the capability to inform the eNB when the UE enables/disables its discovery functionality.

(4.2.2.2. Discovery in IDLE Mode)

Although the method proposed in section 4.2.2.1 is useful for the UEs in RRC connected, the same is not true for UEs in idle. IDLE UEs would be required to transition to CONNECTED, send D2D interest indication, and get handed over to a D2D capable cell before D2D discovery is possible.

In order to achieve similar efficiency for UEs to receive/transmit D2D discovery signals, IDLE UEs should be allowed to prioritize D2D frequency as part of the reselection procedure. Currently, the frequency priority for reselection is determined by the eNB; however, if IDLE UEs are interested in D2D, it should be possible for IDLE UEs to prioritize D2D frequency. This idea is similar to the current MBMS behavior whereby IDLE UEs interested in MBMS are allowed to prioritize MBMS frequency for reselection.

Proposal 8: IDLE UEs with D2D enabled should be allowed to prioritize a D2D frequency for reselection.

If Proposals 2 and Proposal 8 are agreeable, an IDLE UE may prioritize D2D frequency based on the D2D information provided in the SIB of its serving cell.

(4.3. Comparison of the Alternatives)

As a summary, we provided a comparison of the alternatives as shown in Table 2.

TABLE 2

|  | Alternative 1 | Alternative 2 | Alternative 3 |
|---|---|---|---|
| Method | D2D reception on different frequency from serving frequency | D2D transmission on different frequency from serving frequency | Handover/reselection before discovery |
| Complexity/Standard impact | Medium Based on gap assignment similar to RRM | High (not analyzed) | Low Based on MEMS-like mechanism |
| Flexibility Drawback | Medium Trade-off between WAN DL/UL opportunity and discovery probability. | potentially high (not analyzed) | Low D2D operating frequency may be limited and increased network congestion is possible. |
| Proposal | Should be supported for Rel-12 | Should be excluded from Rel-12 | May be considered for Rel-12 |

Proposal 9: RAN2 should consider if one or more of the above alternative(s) should be adopted in Rel-12 to support inter-frequency discovery.

INDUSTRIAL APPLICABILITY

The present disclosure is useful for communication fields.

The invention claimed is:

1. A user terminal located inside the coverage area of a first cell, the first cell operating at a first frequency in a mobile communication system that supports a D2D (Device to Device) proximity service, the user terminal comprising:
a processor configured to
transmit a D2D interest indication to a base station operating in the first cell, the D2D interest indication indicating that the user terminal has an interest in the D2D proximity service, wherein the transmission of the D2D interest indication enables the base station to determine one of the first cell and the second cell where the user terminal will operate to obtain the D2D proximity service, wherein the D2D proximity service includes a D2D discovery signal step for discovering other user terminals located in one of the first cell operating at the first frequency and a second cell operating at a second frequency; and
transmit a D2D discovery signal of the D2D discovery signal step to another user terminal in one of the first cell or the second cell where the D2D resources are available.

2. The user terminal according to claim 1, wherein the processor is configured to transmit the D2D interest indication, upon a condition that the D2D resources are available at the second cell operating on the second frequency.

3. The user terminal according to claim 2,
wherein the processor is configured to receive a SIB (System Information Block) notified from the base station forming the first cell operating at the first frequency, the SIB including information indicating that the D2D resources are available on the second cell operating at the second frequency.

4. The user terminal according to claim 1, wherein the processor is configured to receive a handover command from the base station to handover the user terminal to the second cell operating on the second frequency, wherein D2D resources are available only in the second cell operating in the second frequency.

5. An apparatus for controlling a user terminal, the user terminal located inside the coverage area of a first cell, the first cell operating at a first frequency in a mobile communication system that supports a D2D (Device to Device) proximity service, the apparatus comprising:
a processor configured
to transmit a D2D interest indication to a base station operating in the first cell, the D2D interest indication indicating that the user terminal has an interest in the D2D proximity service, wherein the transmission of the D2D interest indication enables the base station to determine one of the first cell and the second cell where the user terminal will operate to obtain the D2D proximity service, wherein the D2D proximity service includes a D2D discovery signal step for discovering other user terminals located in one of the first cell operating at the first frequency and a second cell operating at a second frequency; and
to transmit a D2D discovery signal of the D2D discovery signal step to another user terminal in one of the first cell or the second cell where the D2D resources are available.

6. The apparatus according to claim 5, wherein the processor transmits the D2D interest indication, upon condition that the D2D resources are available at the second cell operating on the second frequency.

7. The apparatus according to claim 6, wherein the processor receives information notified from the base station forming the first cell operating at the first frequency, the information indicating that the D2D resources are available on the second cell operating at the second frequency.

8. The apparatus according to claim 5, wherein the processor receives a handover command from the base station to handover the user terminal to the second cell operating on the second frequency, wherein D2D resources are available only in the second cell operating in the second frequency.

9. The processor of claim 1, wherein obtaining the D2D proximity service in one of the first cell and the second cell includes determining the availability of D2D resources.

10. The user terminal according to claim 1, wherein as a result of the D2D interest indication transmitted to base station, the user terminal does not receive a handover to the second cell operating on the second frequency when the second cell does not provide D2D resources.

11. The user terminal according to claim 1, wherein the D2D resources are provided only in the second cell operating in the second frequency.

12. The user terminal according to claim 1, wherein the user terminal determines which other user terminals UEs it wants to perform D2D proximity service with other user terminals without assistance from the base station.

* * * * *